United States Patent
Suzuki et al.

(10) Patent No.: US 9,350,029 B2
(45) Date of Patent: May 24, 2016

(54) FUEL CELL STACK

(71) Applicant: HONDA MOTOR CO., LTD., Minato-ku, Tokyo (JP)

(72) Inventors: Masaharu Suzuki, Utsunomiya (JP); Kenji Nagumo, Tokyo (JP); Kentaro Ishida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 256 days.

(21) Appl. No.: 14/082,484

(22) Filed: Nov. 18, 2013

(65) Prior Publication Data

US 2014/0141352 A1    May 22, 2014

(30) Foreign Application Priority Data

| Nov. 21, 2012 | (JP) | ................................. 2012-255172 |
| Nov. 21, 2012 | (JP) | ................................. 2012-255323 |
| Dec. 26, 2012 | (JP) | ................................. 2012-282151 |

(51) Int. Cl.
*H01M 8/24* (2016.01)
*H01M 8/02* (2016.01)

(52) U.S. Cl.
CPC ............ *H01M 8/0258* (2013.01); *H01M 8/242* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| 2006/0003206 | A1* | 1/2006 | Sugiura | ............... H01M 8/0247 429/434 |
| 2006/0088740 | A1* | 4/2006 | Sakano | ............... H01M 8/0247 429/434 |
| 2010/0310958 | A1 | 12/2010 | Naito et al. | |
| 2011/0123887 | A1* | 5/2011 | Suda | .................... H01M 8/0267 429/435 |
| 2011/0274999 | A1 | 11/2011 | Mohri et al. | |
| 2012/0129071 | A1* | 5/2012 | Sato | .................... H01M 8/0204 429/457 |

FOREIGN PATENT DOCUMENTS

| CN | 101908636 A | 12/2010 |
| JP | 2010-282931 A | 12/2010 |
| JP | 2011-119061 A | 6/2011 |
| JP | 2011-171115 A | 9/2011 |
| JP | 2011-175880 A | 9/2011 |
| WO | 2010/082589 A1 | 7/2010 |

OTHER PUBLICATIONS

Office Action and Search Report dated Jul. 10, 2015 issued over the corresponding Chinese Patent Application No. 201310585893.6 with English translation of pertinent portion.
Office Action dated Jul. 1, 2015 issued over the corresponding JP Patent Application No. 2012-255323 with the English translation of pertinent portion.

* cited by examiner

*Primary Examiner* — Sarah A Slifka
*Assistant Examiner* — Haroon S Sheikh
(74) *Attorney, Agent, or Firm* — Carrier Blackman & Associates, P.C.; William D. Blackman; Joseph P. Carrier

(57) ABSTRACT

A fuel cell stack has an asymmetrical triangular inlet buffer. An inlet connection channel connects a coolant supply passage on the upper side and the inlet buffer, and an inlet connection channel connects a coolant supply passage on the lower side and the inlet buffer. The number of flow grooves in the inlet connection channel is different from the number of flow grooves in the inlet connection channel.

13 Claims, 15 Drawing Sheets

FUEL CELL STACK

CROSS-REFERENCE TO RELATED APPLICATIONS

This application is based upon and claims the benefit of priority from Japanese Patent Applications No. 2012-255172 filed on Nov. 21, 2012, No. 2012-255323 filed on Nov. 21, 2012 and No. 2012-282151 filed on Dec. 26, 2012, the contents all of which are incorporated herein by reference.

BACKGROUND OF THE INVENTION

1. Field of the Invention

The present invention relates to a fuel cell stack formed by stacking a plurality of fuel cells together. Each of the fuel cells is formed by stacking a membrane electrode assembly and separators together. The membrane electrode assembly includes a pair of electrodes and an electrolyte membrane interposed between the electrodes.

2. Description of the Related Art

For example, a solid polymer electrolyte fuel cell employs an electrolyte membrane. The electrolyte membrane is a polymer ion exchange membrane. In the fuel cell, the electrolyte membrane is interposed between an anode and a cathode to form a membrane electrode assembly (MEA). The membrane electrode assembly is sandwiched between a pair of separators to form a unit cell. In use, in the fuel cell of this type, generally, a predetermined number of unit cells are stacked together to form a fuel cell stack, e.g., mounted in a vehicle.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the adjacent separators of the fuel cells for supplying a coolant within electrode areas along surfaces of the separators.

Further, mostly, the fuel cell of this type adopts so called internal manifold structure in which a fuel gas supply passage and a fuel gas discharge passage, an oxygen-containing gas supply passage and an oxygen-containing gas discharge passage, and a coolant supply passage and a coolant discharge passage are formed in the fuel cell for allowing the fuel gas, the oxygen-containing gas, and the coolant to flow through the unit cells in the stacking direction.

For example, a fuel cell stack disclosed in International Publication No. WO 2010/082589 is formed by stacking an electrolyte electrode assembly and metal separators. The electrolyte electrode assembly includes a pair of electrodes and an electrolyte interposed between the electrodes. Each of the metal separators has rectangular surfaces. The metal separator has a power generation unit including a corrugated gas flow field on its surface facing the electrode for supplying the fuel gas or the oxygen-containing gas as a reactant gas along the electrode. Power generation units are stacked together such that a coolant flow field is formed between the power generation units on a back surface of the corrugated gas flow field.

A reactant gas supply passage and a reactant gas discharge passage as passages of the reactant gas extend through opposite two sides of the metal separators. A pair of coolant supply passages and a pair of coolant discharge passages as passages of the coolant extend through the other opposite two sides of the metal separators, at least adjacent to the reactant gas supply passage or the reactant gas discharge passage, separately on the respective sides.

Since the pair of coolant supply passages are provided separately on the opposite two sides and the pair of coolant discharge passages are provided separately on the opposite two sides, it is possible to supply the coolant uniformly and reliably to the entire coolant flow field.

SUMMARY OF THE INVENTION

In the fuel cell, in practice, mostly, the coolant supply passages and the coolant flow field are connected by connection channels each including a plurality of flow grooves, and a buffer is provided at the inlet of the coolant flow field, between the pair of coolant supply passages.

In the structure, the coolant flows from the coolant supply passages to the coolant flow field through the connection channels, i.e., the coolant is supplied to the power generation area (electrode area), and supplied to the central position of the power generation area by bypassing the coolant to the buffer. However, since the coolant tends to flow through the shortest route, it may not be possible to sufficiently supply the coolant to the central position of the power generation area.

Further, the buffer tends to have an asymmetrical shape due to the shapes of openings of the reactant gas supply passage and the reactant gas discharge passage, and positions, shapes, or the like of other components such as reinforcement members and positioning members. For example, an asymmetrical triangle buffer is used. Therefore, in terms of the width, since the shape of the buffer is asymmetrical in the width direction of the coolant flow field, the coolant supplied from the pair of the coolant supply passages to the buffer tends to flow through the buffer non-uniformly. Thus, the temperature in the power generation area becomes non-uniform, and local degradation or stagnation of water may occur undesirably due to the non-uniform temperature.

The present invention has been made to solve the problem of this type, and an object of the present invention is to provide a fuel cell stack having simple structure which makes it possible to supply a coolant to the entire surface of a power generation area uniformly, and suppress local degradation or stagnation of water due to the non-uniform temperature.

The present invention relates to a fuel cell stack formed by stacking a plurality of fuel cells together. Each of the fuel cells is formed by stacking a membrane electrode assembly and separators together. The membrane electrode assembly includes a pair of electrodes and an electrolyte membrane interposed between the electrodes. A coolant flow field is formed between adjacent separators for allowing a coolant to flow along surfaces of the separators. A pair of coolant supply passages are provided at an inlet of the coolant flow field, on both sides of the coolant flow field in a flow field width direction, and a pair of coolant discharge passages are provided at an outlet of the coolant flow field on both sides of the coolant flow field in the flow field width direction.

In the fuel cell stack, a buffer is provided at the inlet of the coolant flow field, between the pair of coolant supply passages, and a buffer is provided at the outlet of the coolant flow field, between the pair of coolant discharge passages.

Each of the buffers has an asymmetrical triangular shape including a vertex at a position spaced from a center in the flow field width direction toward one side in the flow field width direction. The pair of coolant supply passages are connected to the buffer at the inlet through connection channels, and the pair of coolant discharge passages are connected to the buffer at the outlet through connection channels. In at least the pair of coolant supply passages or the pair of coolant discharge passages, a number of flow grooves in one of the connection channels is different from a number of flow grooves in another of the connection channels.

Further, in the fuel cell stack, at least each of the coolant supply passages or the coolant discharge passages has a rectangular opening elongated in a flow direction of the coolant flow field, and a rib is provided at an intermediate position of the rectangular opening in the longitudinal direction for dividing the rectangular opening into a first area and a second area.

Further, in the fuel cell stack, at least each of the coolant supply passages has a rectangular opening elongated in a flow direction of the coolant flow field, and has a slope for decreasing a cross sectional area of the opening in a direction closer to the buffer.

In the present invention, the number of flow grooves in a connection channel of one of a pair of fluid passages is different from the number of flow grooves in the other of the pair of fluid passages in correspondence with the asymmetrical triangular buffer. In the structure, it is possible to supply a large quantity of coolant to the portion of the buffer where the coolant does not flow smoothly, in comparison with the remaining portion of the buffer. Therefore, it becomes possible to supply the coolant to the entire coolant flow field uniformly.

Accordingly, with the simple structure, it is possible to supply the coolant over the entire power generation area, and it becomes possible to suppress local degradation or stagnation of water due to the non-uniform temperature.

Further, in the present invention, each of at least the coolant supply passages or the coolant discharge passages is divided into a first area and a second area by a rib. In the structure, a larger quantity of coolant is supplied to one of the first area and the second area having the lower pressure loss, i.e., having the larger cross sectional area. Therefore, simply be providing the rib at a desired position, it becomes possible to supply the coolant to the entire coolant flow field uniformly.

Accordingly, with the simple structure, the coolant can be supplied to the entire coolant flow field uniformly, and it becomes possible to suppress local degradation or stagnation of water due to the non-uniform temperature.

Further, in the present invention, in each of at least the coolant supply passages, a slope is provided for decreasing the cross sectional area of the opening in a direction closer to the buffer. In the structure, the coolant flows from the slope toward the center of the buffer. Thus, the coolant can be supplied reliably not only toward both ends in the width direction adjacent to the pair of coolant supply passages but also toward the central position in the width direction. Therefore, it becomes possible to supply the coolant suitably to the entire buffer, and the coolant can be supplied to the entire coolant flow field uniformly.

Accordingly, with the simple structure, it is possible to supply the coolant over the entire power generation area, and it becomes possible to suppress local degradation of the MEA or stagnation of water due to the non-uniform temperature.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a graph showing comparison of the flow rate of a coolant supplied to a coolant flow field in an example a of the present application and a conventional example a;

DESCRIPTION OF THE PREFERRED EMBODIMENTS

Figure 1:
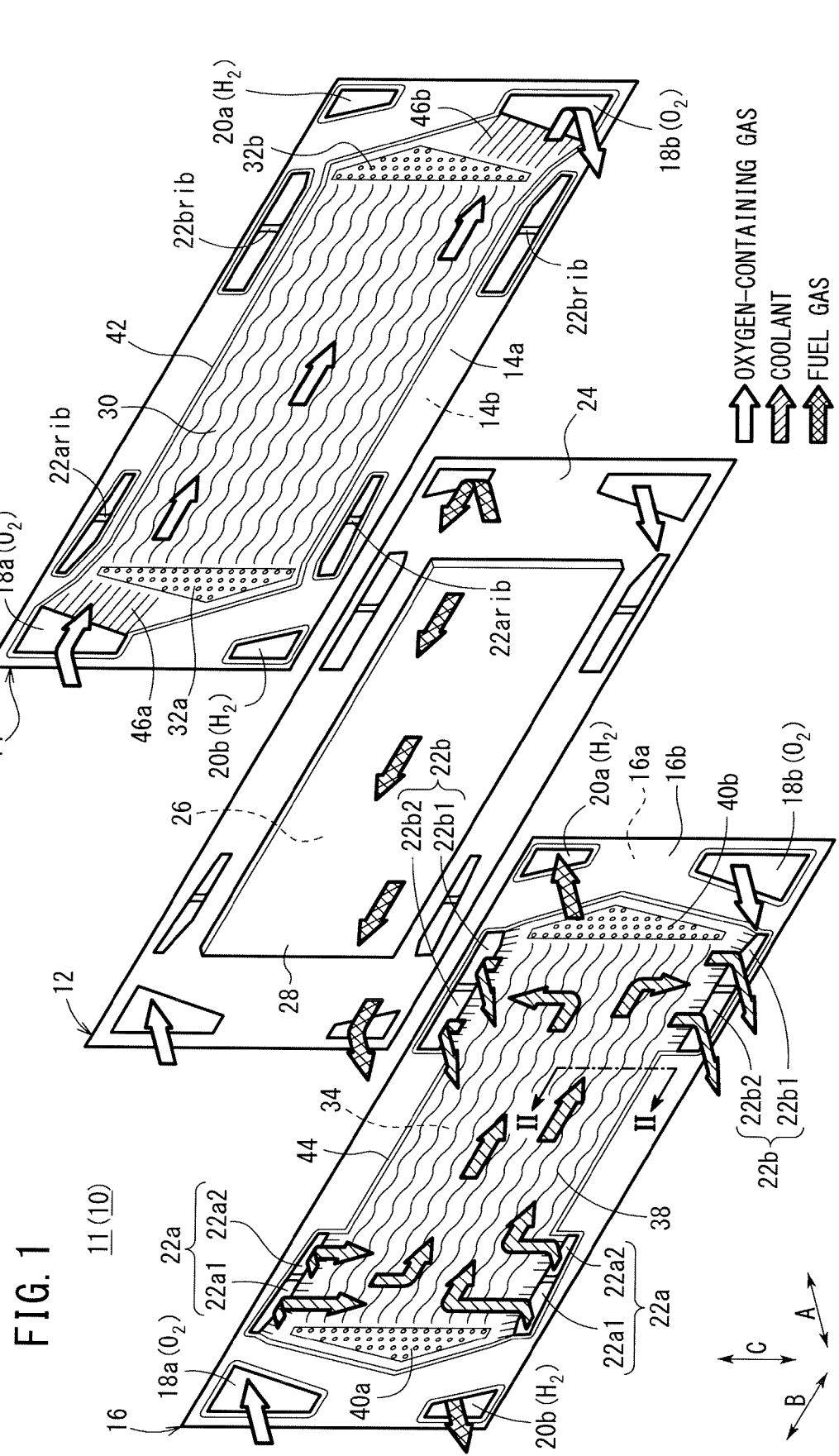
FIG. 1 is an exploded perspective view showing main components of a fuel cell stack according to a first embodiment of the present invention.
Figure 2:
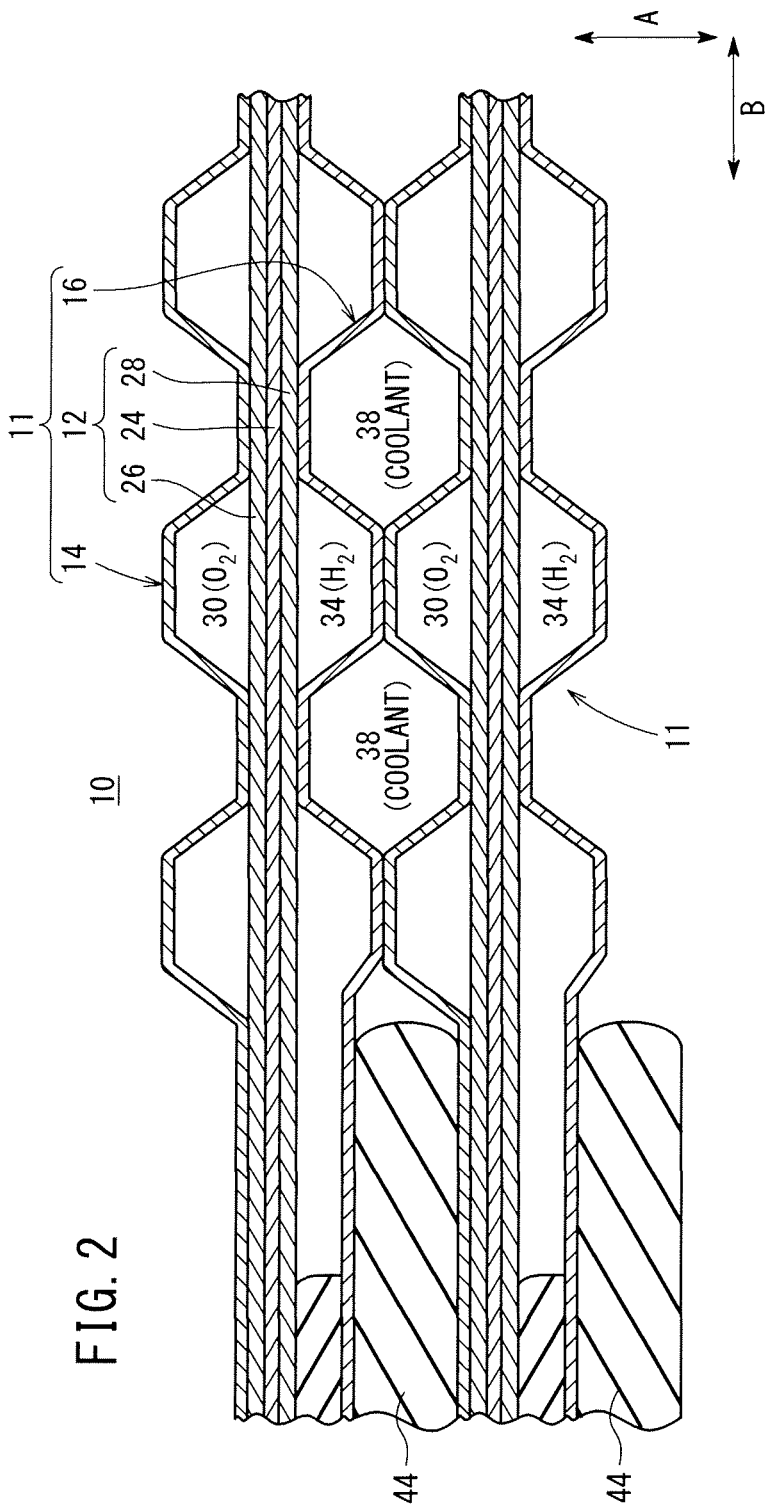
FIG. 2 is a cross sectional view showing the fuel cell, taken along a line II-II in FIG. 1.

As shown in FIGS. 1 and 2, a fuel cell stack 10 according to a first embodiment of the present invention is formed by stacking a plurality fuel cells 11 together upright in a direction indicated by an arrow A (such that electrode surfaces are oriented in parallel with the vertical direction). Each of the fuel cells 11 includes a membrane electrode assembly 12 and a cathode side separator 14 and an anode side separator 16 sandwiching the membrane electrode assembly 12.

For example, the cathode side separator 14 and the anode side separator 16 are thin metal separators made of metal plates such as steel plates, stainless steel plates, aluminum plates, plated steel sheets, or metal plates having anti-corrosive surfaces by surface treatment. The metal separators have rectangular surfaces, and are formed by corrugating metal thin plates by press forming to have a corrugated shape in cross section and a wavy or serpentine form on the surface. Alternatively, instead of the metal separators, carbon members may be used as the cathode side separator 14 and the anode side separator 16.

The cathode side separator 14 and the anode side separator 16 have a laterally elongated shape. Short sides of the cathode side separator 14 and the anode side separator 16 are oriented in the direction of gravity indicated by an arrow C, and long sides of the cathode side separator 14 and the anode side separator 16 are oriented in a horizontal direction indicated by an arrow B. In the structure, the cathode side separator 14 and the anode side separator 16 are stacked horizontally. Alternatively, short sides of the cathode side separator 14 and the anode side separator 16 may be oriented in the horizontal direction, and long sides of the cathode side separator 14 and the anode side separator 16 may be oriented in the direction of gravity. Further, surfaces of the cathode side separator 14 and the anode side separator 16 may be oriented in the horizontal direction (the cathode side separator 14 and the anode side separator 16 may be stacked in the vertical direction).

At one end of the fuel cell 11 in a longitudinal direction indicated by the arrow B, an oxygen-containing gas supply passage 18a for supplying an oxygen-containing gas, and a fuel gas discharge passage 20b for discharging a fuel gas such as a hydrogen-containing gas are provided. The oxygen-containing gas supply passage 18a and the fuel gas discharge passage 20b extend through the fuel cell 11 in the direction indicated by the arrow A. Each of the openings of the oxygen-containing gas supply passage 18a and the fuel gas discharge passage 20b has a substantially triangular shape, and the opening area of the oxygen-containing gas supply passage 18a is larger than the opening area of the fuel gas discharge passage 20b.

At the other end of the fuel cell 11 in the longitudinal direction, a fuel gas supply passage 20a for supplying the fuel gas and an oxygen-containing gas discharge passage 18b for discharging the oxygen-containing gas are provided. The fuel gas supply passage 20a and the oxygen-containing gas discharge passage 18b extend through the fuel cell 11 in the direction indicated by the arrow A. Each of the oxygen-containing gas discharge passage 18b and the fuel gas supply passage 20a has a substantially triangular shape, the opening area of the oxygen-containing gas discharge passage 18b is larger than the opening area of the fuel gas supply passage 20a.

On one side at both ends of the fuel cell 11 in the lateral direction indicated by the arrow C, two coolant supply passages 22a for supplying a coolant are provided. On the other side at both ends of the fuel cell 11 in the lateral direction, two coolant discharge passages 22b for discharging the coolant are provided. The coolant supply passages 22a and the coolant discharge passages 22b extend through the fuel cell 11 in the direction indicated by the arrow A.

The opening of the coolant supply passage 22a has a rectangular shape elongated in the flow direction of a coolant flow field 38 indicated by the arrow B. At an intermediate position in the longitudinal direction of each of the rectangular coolant supply passages 22a, a rib 22arib dividing the rectangular shape into a first area 22a1 and a second area 22a2 is provided. The rib 22arib is not essential, and provided as necessary. The rib 22arib may not be provided.

The opening of the coolant discharge passage 22b has a rectangular shape elongated in the flow direction of the coolant flow field 38 indicated by the arrow B. At an intermediate position in the longitudinal direction of each of the rectangular coolant discharge passages 22b, a rib 22brib dividing the rectangular shape into a first area 22b1 and a second area 22b2 is provided. The rib 22brib is not essential, and provided as necessary. The rib 22brib may not be provided.

The membrane electrode assembly 12 includes, e.g., a fluorine based or hydrocarbon based solid polymer electrolyte membrane 24, and a cathode 26 and an anode 28 sandwiching the solid polymer electrolyte membrane 24.

Each of the cathode 26 and the anode 28 has a gas diffusion layer (not shown) such as a carbon paper, and an electrode catalyst layer (not shown) of porous carbon particles supporting platinum alloy thereon. The carbon particles are deposited uniformly on the surface of the gas diffusion layer. The electrode catalyst layer of the cathode 26 and the electrode catalyst layer of the anode 28 are fixed to both surfaces of the solid polymer electrolyte membrane 24, respectively.

As shown in FIG. 1, the cathode side separator 14 has an oxygen-containing gas flow field 30 on its surface 14a facing the membrane electrode assembly 12. The oxygen-containing gas flow field 30 is connected to the oxygen-containing gas supply passage 18a and the oxygen-containing gas discharge passage 18b. An inlet buffer 32a including a plurality of bosses is provided adjacent to the inlet of the oxygen-containing gas flow field 30, and an outlet buffer 32b including a plurality of bosses is provided adjacent to the outlet of the oxygen-containing gas flow field 30.

The inlet buffer 32a has a substantially triangular shape in correspondence with the shapes of the oxygen-containing gas supply passage 18a and the fuel gas discharge passage 20b. Further, a vertex of the inlet buffer 32a (top vertex of the triangle) is spaced downward from the central position in the height direction indicated by the arrow C. Assuming that the base of the triangular inlet buffer 32a is in the flow field width direction, the length of one side is different from the length of the other side. The outlet buffer 32b has a substantially triangular shape in correspondence with the shapes of the fuel gas supply passage 20a and the oxygen-containing gas discharge passage 18b. Further, a vertex of the outlet buffer 32b (a top vertex of the triangle) is spaced upward from the central position in the height direction indicated by the arrow C.

Figure 3:
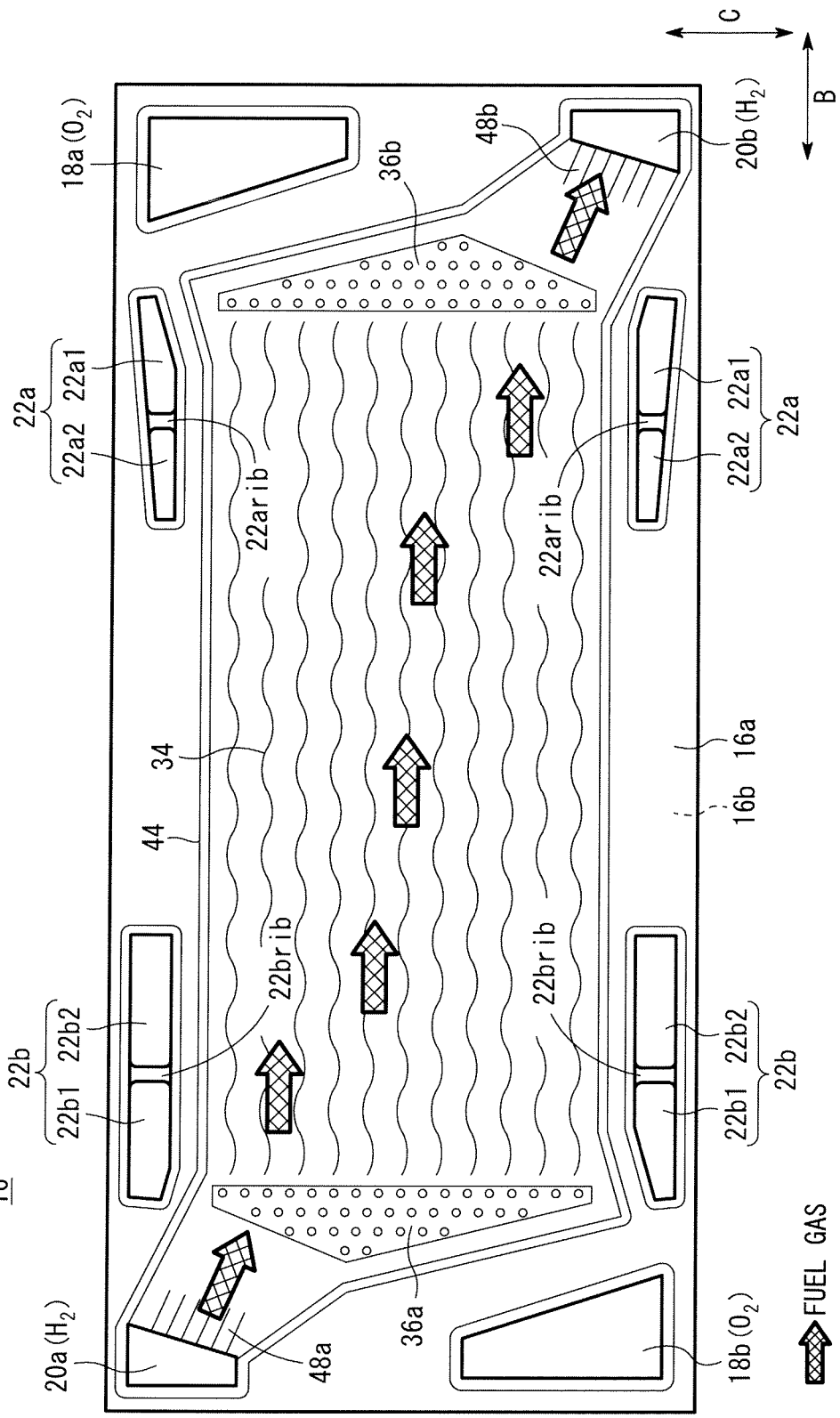
FIG. 3 is a view showing one surface of an anode side separator of the fuel cell.

As shown in FIG. 3, the anode side separator 16 has a fuel gas flow field 34 on its surface 16a facing the membrane electrode assembly 12. The fuel gas flow field 34 is connected to the fuel gas supply passage 20a and the fuel gas discharge passage 20b. An inlet buffer 36a including a plurality of bosses is provided adjacent to the inlet of the fuel gas flow field 34, and an outlet buffer 36b including a plurality of bosses is provided adjacent to the outlet of the fuel gas flow field 34.

The inlet buffer 36a has a substantially triangular shape in correspondence with the shapes of the fuel gas supply passage 20a and the oxygen-containing gas discharge passage 18b. A vertex of the inlet buffer 36a (top vertex of the triangle) is spaced upward from the central position in the height direction. The outlet buffer 36b has an asymmetrical triangular shape in correspondence with the shapes of the oxygen-containing gas supply passage 18a and the fuel gas discharge passage 20b. A vertex of the outlet buffer 36b (a top vertex of the triangle) is spaced downward from the central position in the height direction indicated by the arrow C.

A coolant flow field 38 is formed between a surface 16b of the anode side separator 16 and a surface 14b of the cathode side separator 14. The coolant flow field 38 is connected to the coolant supply passages 22a and the coolant discharge passages 22b (see FIGS. 1 and 4). In the coolant flow field 38, the coolant flows over the electrode areas of the membrane electrode assembly 12. An inlet buffer 40a is provided adjacent to the inlet of the coolant flow field 38, and an outlet buffer 40b is provided adjacent to the outlet of the coolant flow field 38.

In the anode side separator 16, the coolant flow field 38 is provided on the back surface of the fuel gas flow field 34, the inlet buffer 40a is provided on the back surface of the outlet buffer 36b, and the outlet buffer 40b is provided on the back surface of the inlet buffer 36a. In the cathode side separator 14, the coolant flow field 38 is provided on the back surface of the oxygen-containing gas flow field 30, the inlet buffer 40a is provided on the back surface of the inlet buffer 32a, and the outlet buffer 40b is provided on the back surface of the outlet buffer 32b. Hereinafter, the separator structure will be described in connection with the example of the anode side separator 16.

Figure 4:
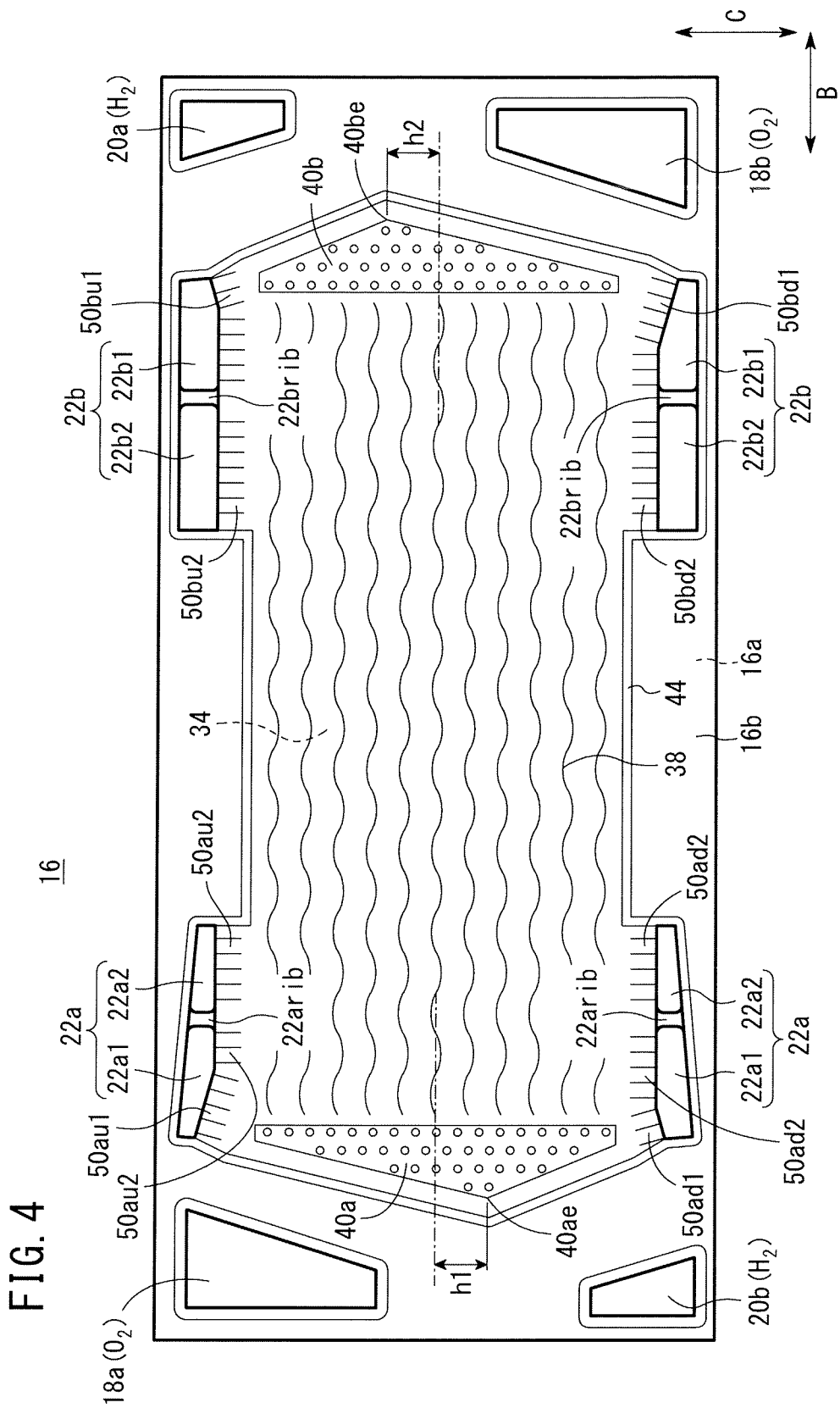
FIG. 4 is a view showing the other surface of the anode side separator.

As shown in FIG. 4, the inlet buffer 40a has an asymmetrical triangular shape in correspondence with the shapes of the oxygen-containing gas supply passage 18a and the fuel gas discharge passage 20b. A vertex 40ae of the inlet buffer 40a is spaced downward from the central position by a distance h1 in the height direction (flow field width direction) indicated by the arrow C. The outlet buffer 40b has an asymmetrical triangular shape in correspondence with the shapes of the fuel gas supply passage 20a and the oxygen-containing gas discharge passage 18b. A vertex 40be of the outlet buffer 40b is spaced upward from the central position by a distance h2 in the height direction (flow width direction) indicated by the arrow C.

A first seal member 42 is formed integrally with the surfaces 14a, 14b of the cathode side separator 14 around the outer end of the cathode side separator 14. A second seal member 44 is formed integrally with the surfaces 16a, 16b of the anode side separator 16, around the outer end of the anode side separator 16. Each of the first seal member 42 and the second seal members 44 is an elastic seal member made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

An inlet connection channel 46a including a plurality of flow grooves connecting the inlet buffer 32a and the oxygen-containing gas supply passage 18a, and an outlet connection channel 46b including a plurality of flow grooves connecting the outlet buffer 32b and the oxygen-containing gas discharge passage 18b are formed on a surface 14a of the cathode side separator 14, by cutting the first seal member 42. As shown in FIG. 3, an inlet connection channel 48a including a plurality of flow grooves connecting the inlet buffer 36a and the fuel gas supply passage 20a, and an outlet connection channel 48b including a plurality of flow grooves connecting the outlet buffer 36b and the fuel gas discharge passage 20b are formed on a surface 16a of the anode side separator 16, by cutting the second seal member 44.

As shown in FIG. 4, inlet connection channels 50au1, 50au2 are formed adjacent to the coolant supply passage 22a on the upper side, and inlet connection channels 50ad1, 50ad2 are formed adjacent to the coolant supply passage 22a on the lower side, on a surface 16b of the anode side separator 16, by cutting the second seal member 44. The inlet connection channels 50au1, 50au2 may be formed integrally with the second seal member 44. Alternatively, the inlet connection channels 50au1, 50au2 may be formed in the anode side separator 16 itself.

The inlet connection channel 50au1 connects the coolant supply passage 22a on the upper side and the inlet buffer 40a, and the inlet connection channel 50ad1 connects the coolant supply passage 22a on the lower side and the inlet buffer 40a. The number of flow grooves in the inlet connection channel 50au1 is different from the number of flow grooves in the inlet connection channel 50ad1. In the first embodiment, the number of flow grooves in the inlet connection channel 50au1 is, for example, four, and the number of flow grooves in the inlet connection channel 50ad1 is, for example, two.

Preferably, in each of the inlet connection channel 50au1 and the inlet connection channel 50ad1, the flow grooves have the same sectional area, and the flow grooves are arranged at equal pitches. It should be noted that various modifications can be made to these numbers of flow grooves in correspondence with the shape of the inlet buffer 40a, as long as at least the number of flow grooves in the inlet connection channel 50au1 is larger than the number of flow grooves in the inlet connection channel 50ad1.

The inlet connection channel 50au2 connects the coolant supply passage 22a on the upper side and the coolant flow field 38. The inlet connection channel 50ad2 connects the coolant supply passage 22a on the lower side and the coolant flow field 38.

Outlet connection channels 50bu1, 50bu2 each including a plurality of flow grooves connecting the coolant discharge passage 22b on the upper side and the outlet buffer 40b, and outlet connection channels 50bd1, 50bd2 each including a plurality of flow grooves connecting the coolant discharge passage 22b on the lower side and the outlet buffer 40b are formed on a surface 16b of the anode side separator 16, by cutting the second seal member 44.

The outlet connection channel 50bu1 connects the coolant discharge passage 22b on the upper side and the outlet buffer 40b, and the outlet connection channel 50bd1 connects the coolant discharge passage 22b on the lower side and the outlet buffer 40b. The number of flow grooves in the outlet connection channel 50bu1 is different from the number of flow grooves in the outlet connection channel 50bd1. In the first embodiment, the number of flow grooves in the outlet connection channel 50bu1 is, for example, two, and the number of flow grooves in the outlet connection channel 50bd1 is, for example, four.

Preferably, in each of the outlet connection channel 50bu1 and the outlet connection channel 50bd1, the flow grooves have the same sectional area, and the flow grooves are arranged at equal pitches. Preferably, the number of flow grooves in the inlet connection channel 50au1 and the number of flow grooves in the outlet connection channel 50bd1 are the same, and the number of flow grooves in the inlet connection channel 50ad1 and the number of flow grooves in the outlet connection channel 50bu1 are the same.

It should be noted that the number of flow grooves in the outlet connection channel 50bu1 may be the same as the number of flow grooves in the outlet connection channel 50bd1. Further, the number of flow grooves in the outlet connection channel 50bu1 may be different from the number of flow grooves in the outlet connection channel 50bd1, and the number of flow grooves in the inlet connection channel 50au1 may be the same as the number of flow grooves in the inlet connection channel 50ad1.

The outlet connection channel 50bu2 connects the coolant discharge passage 22b on the upper side and the coolant flow field 38. The outlet connection channel 50bd2 connects the coolant discharge passage 22b on the lower side and the coolant flow field 38.

Operation of the fuel cell 11 will be described below.

Firstly, as shown in FIG. 1, an oxygen-containing gas is supplied to the oxygen-containing gas supply passage 18a, and a fuel gas such as a hydrogen containing gas is supplied to the fuel gas supply passage 20a. Further, a coolant such as pure water, ethylene glycol, or oil is supplied to the pair of the coolant supply passages 22a.

Thus, the oxygen-containing gas flows from the oxygen-containing gas supply passage 18a into the oxygen-containing gas flow field 30 of the cathode side separator 14. The oxygen-containing gas moves along the oxygen-containing gas flow field 30 in the horizontal direction indicated by the arrow B, and the oxygen-containing gas is supplied to the cathode 26 of the membrane electrode assembly 12 for inducing an electrochemical reaction at the cathode 26.

In the meanwhile, the fuel gas flows from the fuel gas supply passage 20a into the fuel gas flow field 34 of the anode side separator 16. As shown in FIG. 3, the fuel gas moves along the fuel gas flow field 34 in the horizontal direction indicated by the arrow B, and the fuel gas is supplied to the anode 28 of the membrane electrode assembly 12 for inducing an electrochemical reaction at the anode 28 (see FIG. 1).

Thus, in the membrane electrode assembly 12, the oxygen-containing gas supplied to the cathode 26, and the fuel gas supplied to the anode 28 are partially consumed in the electrochemical reactions at catalyst layers of the cathode 26 and the anode 28 for generating electricity.

The oxygen-containing gas partially consumed at the cathode 26 of the membrane electrode assembly 12 is discharged along the oxygen-containing gas discharge passage 18b in the direction indicated by the arrow A. Likewise, the fuel gas partially consumed at the anode 28 of the membrane electrode assembly 12 is discharged along the fuel gas discharge passage 20b in the direction indicated by the arrow A.

Further, the coolant supplied to the pair of the coolant supply passages 22a flows into the coolant flow field 38 between the cathode side separator 14 and the anode side separator 16. As shown in FIGS. 1 and 4, after the coolant temporarily flows inward in the direction of gravity indicated by the arrow C, the coolant moves in the horizontal direction indicated by the arrow B for cooling the membrane electrode assembly 12. Then, after the coolant moves outward in the direction indicated by the arrow C, the coolant is discharged into the pair of coolant discharge passages 22b.

In the first embodiment, as shown in FIG. 4, the number of flow grooves in the inlet connection channel 50au1 is different from the number of flow grooves in the inlet connection channel 50ad1 in correspondence with the asymmetrical triangular inlet buffer 40a. In the structure, it is possible to supply a large quantity of coolant to the portion of the inlet buffer 40a where the coolant does not flow smoothly, in comparison with the remaining portion of the coolant flow field 38. Accordingly, it becomes possible to supply the coolant to the entire coolant flow field 38 uniformly.

Specifically, the vertex 40ae of the inlet buffer 40a is spaced downward from the central position by the distance h1 in the height direction. Further, the number of flow grooves in the inlet connection channel 50au1 is four, and the number of flow grooves in the inlet connection channel 50ad1 is two.

In this regard, comparison of the distribution state of the coolant supplied to the coolant flow field 38 was made using structure where the number of flow grooves in the inlet connection channel 50au1 and the number of flow grooves in the inlet connection channel 50ad1 are the same (conventional example) and structure where the number of flow grooves in the inlet connection channel 50au1 is four and the number of flow grooves in the inlet connection channel 50ad1 is two (example of the present application).

Figure 5:
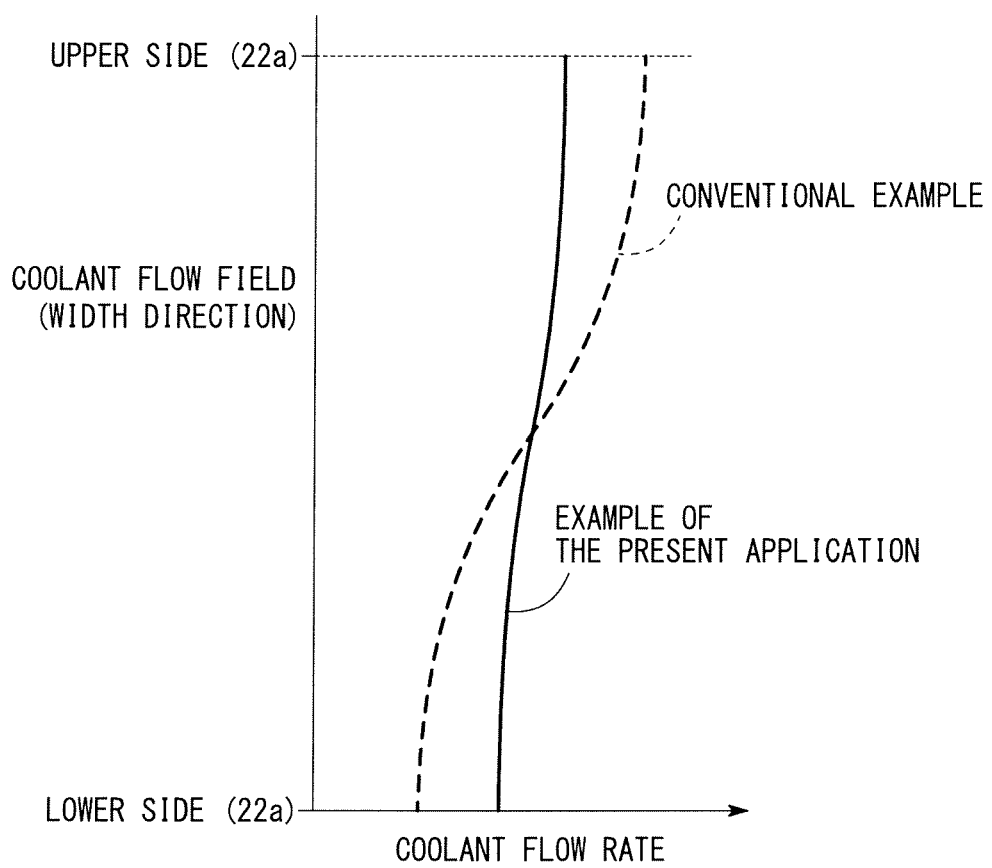
FIG. 5 is a graph showing comparison of the flow rate of a coolant supplied to a coolant flow field in an example of the present application and a conventional example.

As a result, as shown in FIG. 5, in the structure of the conventional example, a large quantity of the coolant was supplied to the upper side of the coolant flow field 38, and a small quantity of the coolant was supplied to the lower side of the coolant flow field 38. Since the inlet buffer 40a has the asymmetrical triangular shape where the vertex 40ae in the horizontal direction is offset downward, the width on the lower side (dimension in the direction indicated by the arrow B) is large. Therefore, the coolant supplied to the lower side of the inlet buffer 40a can flow toward the upper side of the inlet buffer 40a easily.

In the structure, the flow rate of the coolant supplied to the coolant flow field 38 varies in the width direction, and a significant temperature difference occurs in the width direction in the coolant flow field 38. Thus, the durability and the power generation performance are low.

In contrast, in the example of the present application, the number of flow grooves in the inlet connection channel 50ad1 on the lower side is smaller than the number of flow grooves in the inlet connection channel 50ad1 on the upper side. Thus, as shown in FIG. 6, the flow rate of the coolant supplied from the inlet connection channel 50au1 is larger than the flow rate of the coolant supplied from the inlet connection channel 50ad1.

Figure 6:
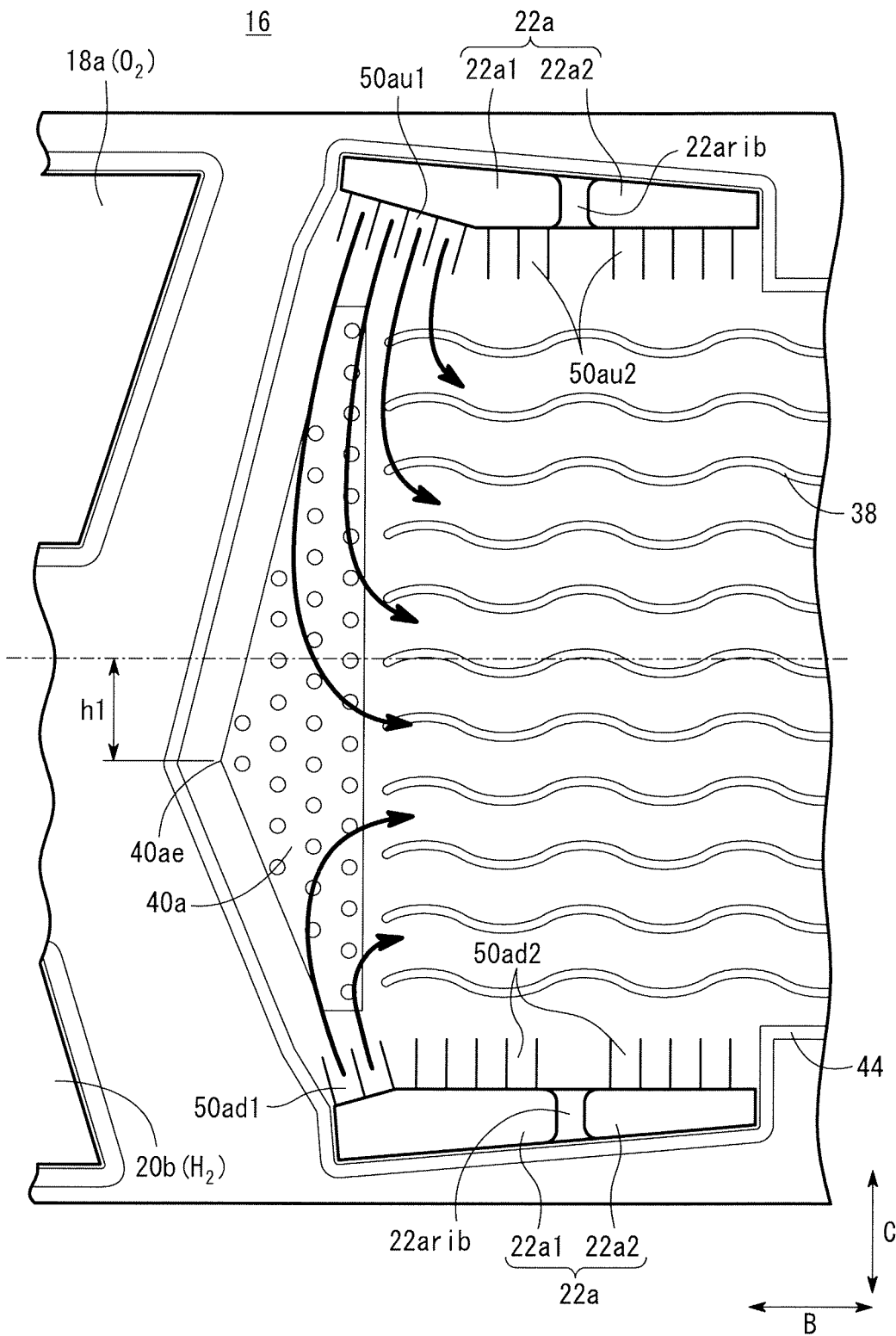
FIG. 6 is a view showing main components of coolant supply passages of the fuel cell.

That is, in the conventional example, in FIG. 6, stagnation of the coolant occurred adjacent to the vertex 40ae of the inlet buffer 40a. In contrast, in the example of the present application, since the number of flow grooves in the inlet connection channel 50au1 is different from the number of flow grooves in the inlet connection channel 50ad1, stagnation adjacent to the vertex 40ae was eliminated. Thus, as shown in FIG. 5, the coolant can be supplied to the coolant flow field 38 uniformly over the width direction.

Accordingly, with the simple structure, it is possible to supply the coolant over the entire power generation area, and it becomes possible to suppress local degradation or stagnation of water due to the non-uniform temperature.

It should be noted that the structure on the part of the coolant discharge passages 22b is the same as the structure on the part of the coolant supply passages 22a, and thus, the same advantages can be obtained.

In the first embodiment, the fuel cell 11 having the single membrane electrode assembly 12, i.e., the single MEA, and the cathode side separator 14 and the anode side separator 16, i.e., the two separators is used. However, the present invention is not limited in this respect. For example, the present invention is applicable to structure where a fuel cell includes unit cells each having two MEAs and three separators sandwiching the MEAs, and the coolant flows between the unit cells.

Figure 7:
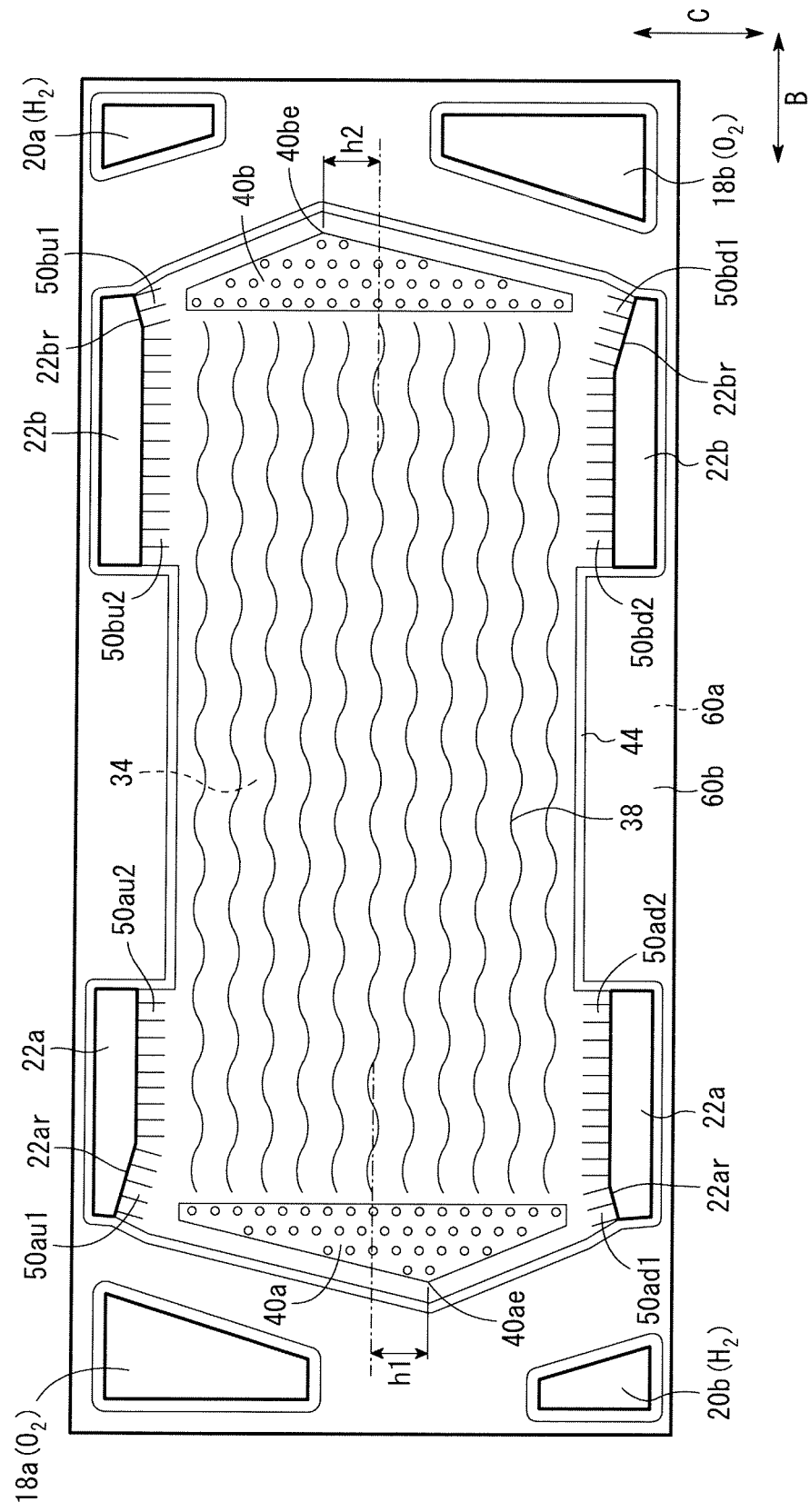
FIG. 7 is a front view showing an anode side separator of a fuel cell stack according to a second embodiment of the present invention.

FIG. 7 is a front view showing an anode side separator 60 of a fuel cell stack according to a second embodiment of the present invention. The constituent elements that are identical to those of the anode side separator 16 of the fuel cell stack 10 according to the first embodiment are labeled with the same reference numerals, and descriptions thereof will be omitted.

On a surface 60a of the anode side separator 60 where the coolant flow field 38 is formed, each of coolant supply passages 22a has a rectangular shape elongated in a direction indicated by an arrow B, and has a slope 22ar at its end adjacent to the inlet buffer 40a.

An inlet connection channel 50au1 is formed along the slope 22ar adjacent to the coolant supply passage 22a on the upper side. An inlet connection channel 50ad1 is formed along the slope 22ar adjacent to the coolant supply passage 22a on the lower side.

On the surface 60a of the anode side separator 60 where the coolant flow field 38 is formed, each of coolant discharge passages 22b has a rectangular shape elongated in the direction indicated by the arrow B, and has a slope 22br at its end adjacent to the outlet buffer 40b. An outlet connection channel 50bu1 is formed along the slope 22br adjacent to the coolant discharge passage 22b on the upper side. An outlet connection channel 50bd1 is formed along the slope 22br adjacent to the coolant discharge passage 22b on the lower side.

In the second embodiment, the number of flow grooves in the inlet connection channel 50au1 is different from the number of flow grooves in the inlet connection channel 50ad1 in correspondence with the asymmetrical triangular inlet buffer 40a. In the structure, the same advantages as in the case of the first embodiment are obtained. For example, it becomes possible to supply the coolant to the entire coolant flow field 38 uniformly.

Figure 8:
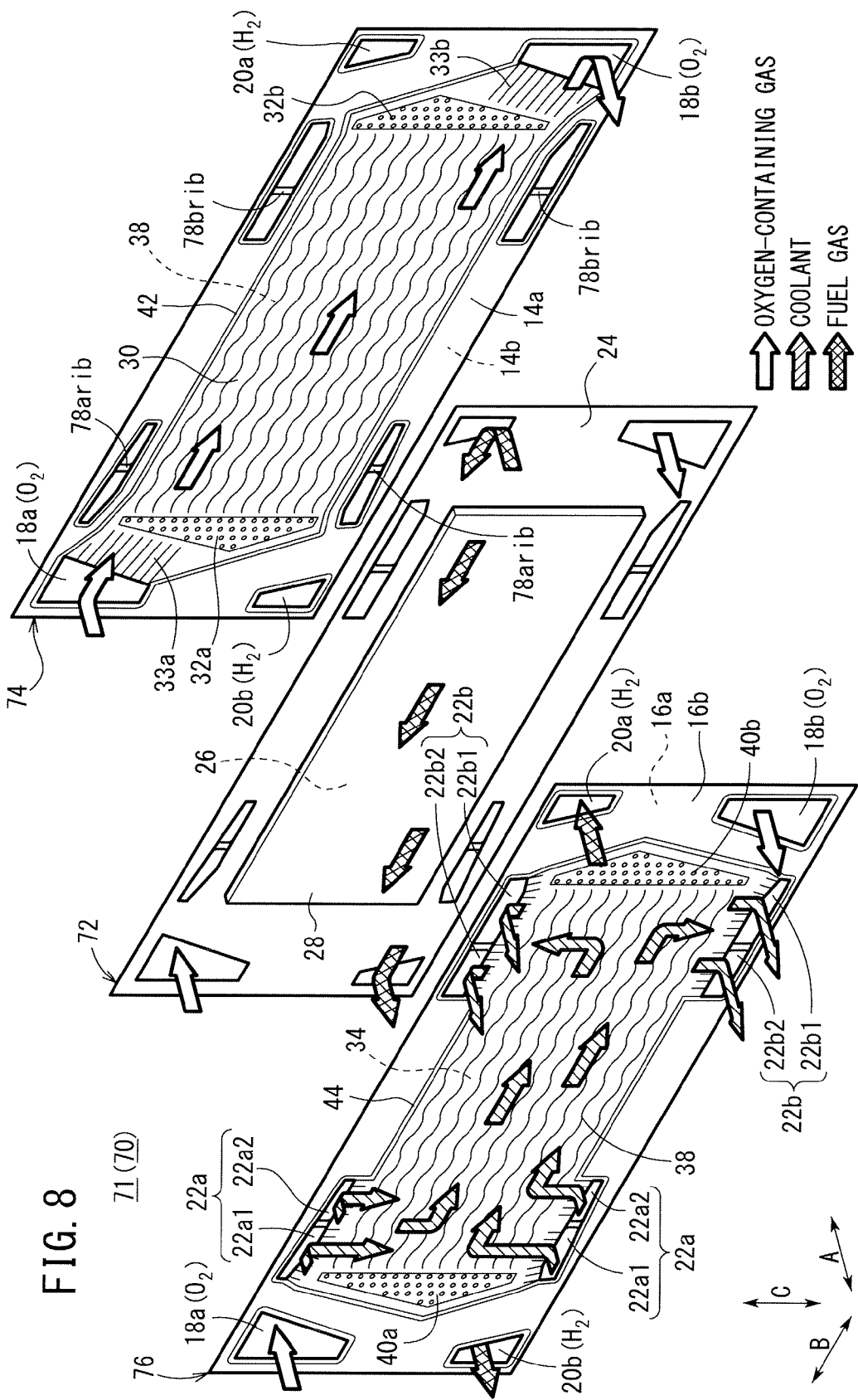
FIG. 8 is an exploded perspective view showing main components of a fuel cell of a fuel cell stack according to a third embodiment of the present invention.

As shown in FIG. 8, a fuel cell stack 70 according to a third embodiment of the present invention is formed by stacking a plurality of fuel cells 71 together upright in a direction indicated by an arrow A (such that electrode surfaces are oriented in parallel with the vertical direction). Each of the fuel cells 71 includes a membrane electrode assembly 72 and a cathode side separator 74 and an anode side separator 76 sandwiching the membrane electrode assembly 72. The constituent elements that are identical to those of the fuel cell stack 10 according to the first embodiment are labeled with the same reference numerals, and descriptions thereof will be omitted. Also in a fourth embodiment as described later, the constituent elements that are identical to those of the fuel cell stack 10 according to the first embodiment are labeled with the same reference numerals, and descriptions thereof will be omitted.

Figure 9:
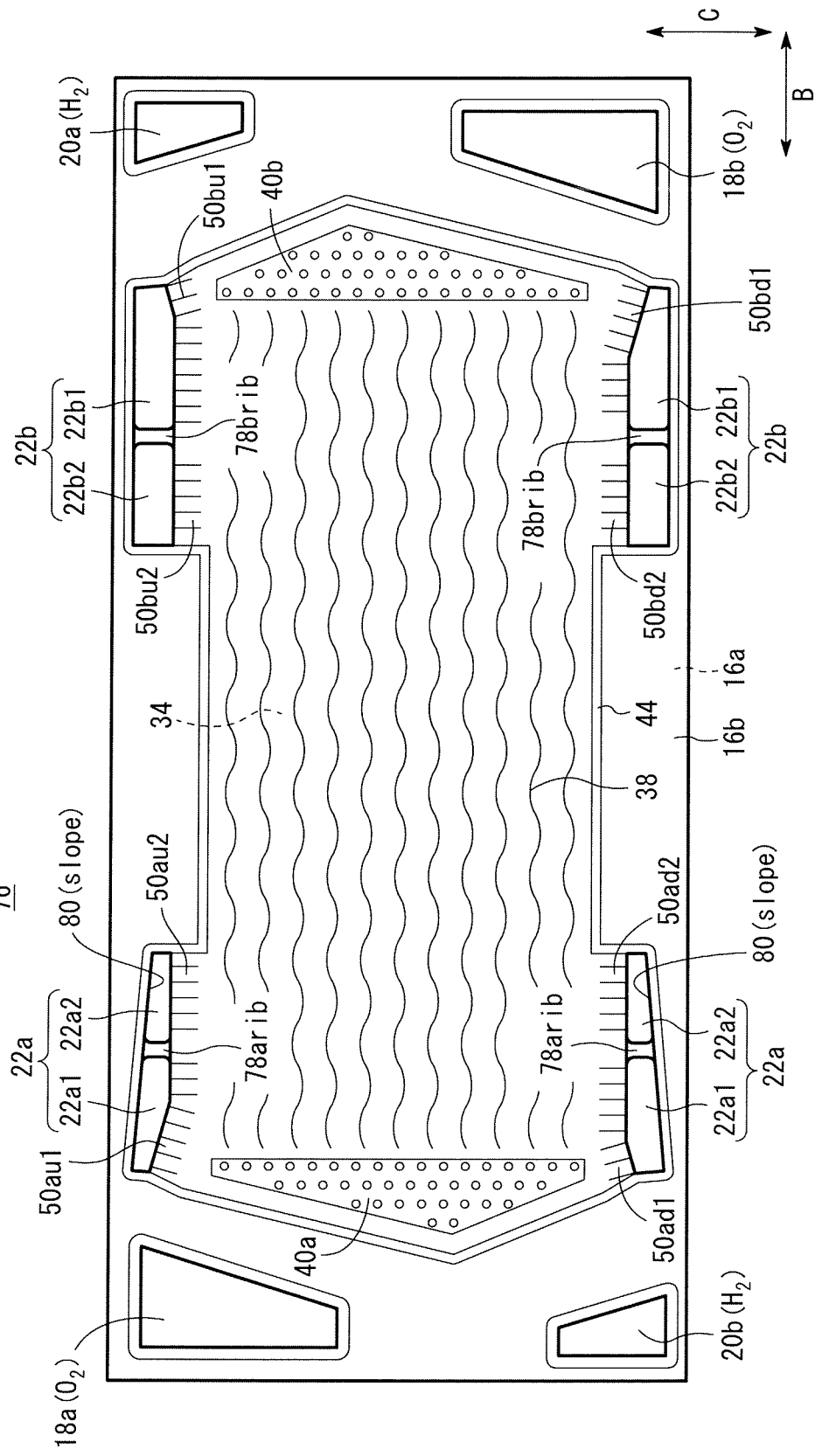
FIG. 9 is a front view showing an anode side separator of the fuel cell.

As shown in FIG. 9, at an intermediate position in the longitudinal direction of each of the rectangular coolant supply passages 22*a*, a rib 78*arib* dividing the rectangular shape into a first area 22*a*1 and a second area 22*a*2 is provided.

In comparison with the second area 22*a*2, the first area 22*a*1 is closer to inlet buffer 40*a*. The opening area of the first area 22*a*1 is larger than the opening area of the second area 22*a*2. That is, the pressure loss in the first area 22*a*1 is smaller than the pressure loss in the second area 22*a*2. A slope 80 is provided in the second area 22*a*2 for decreasing the cross sectional area of the opening as the opening is remoter from the inlet buffer 40*a*.

At an intermediate position in the longitudinal direction of each of the rectangular coolant discharge passages 22*b*, a rib 78*brib* dividing the rectangular shape into a first area 22*b*1 and a second area 22*b*2 is provided.

In the third embodiment, as shown in FIG. 9, the coolant supply passage 22*a* is divided into the first area 22*a*1 and the second area 22*a*2 in the direction indicated by the arrow B by the rib 78*arib*. In the structure, a larger quantity of coolant is supplied to one of the first area 22*a*1 and the second area 22*a*2 having the lower pressure loss, i.e., having the larger cross sectional area. Therefore, simply by providing the rib 78*arib* at a desired position, it becomes possible to supply the coolant to the entire coolant flow field 38 uniformly.

Specifically, the opening area of the first area 22*a*1 is larger than the opening area of the second area 22*a*2, i.e., the pressure loss in the first area 22*a*1 is lower than the pressure loss in the second area 22*a*2.

Figure 10:
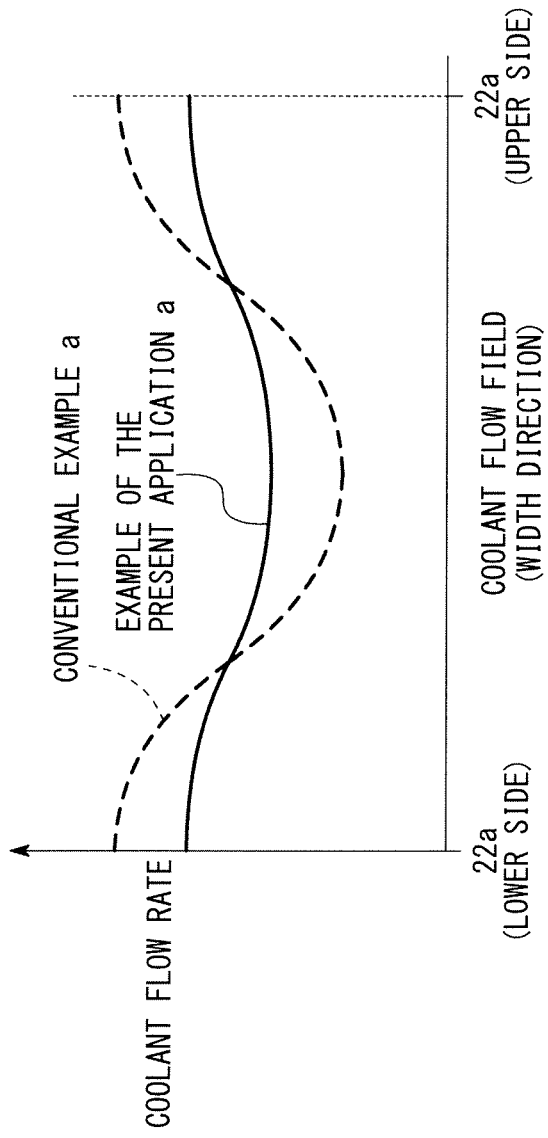

In this regard, for comparison of the distribution state of the coolant supplied to the coolant flow field 38, structure without the rib 78*arib* (conventional example a) and structure having the rib 78*arib* (example a of the present application) were used. As a result, as shown in FIG. 10, in the structure of the conventional example a, a large quantity of coolant is supplied from the coolant supply passage 22*a* to the coolant flow field 38 directly, and a small quantity of the coolant is bypassed to the inlet buffer 40*a*.

In the structure, a large quantity of coolant is supplied to positions at both ends in the width direction of the coolant flow field 38 (adjacent to the coolant supply passages 22*a*), and only a small quantity of coolant is supplied to the central part of the power generation area. Therefore, a significant temperature difference occurs in the width direction in the coolant flow field 38. Thus, the durability and the power generation performance are low.

Figure 11:
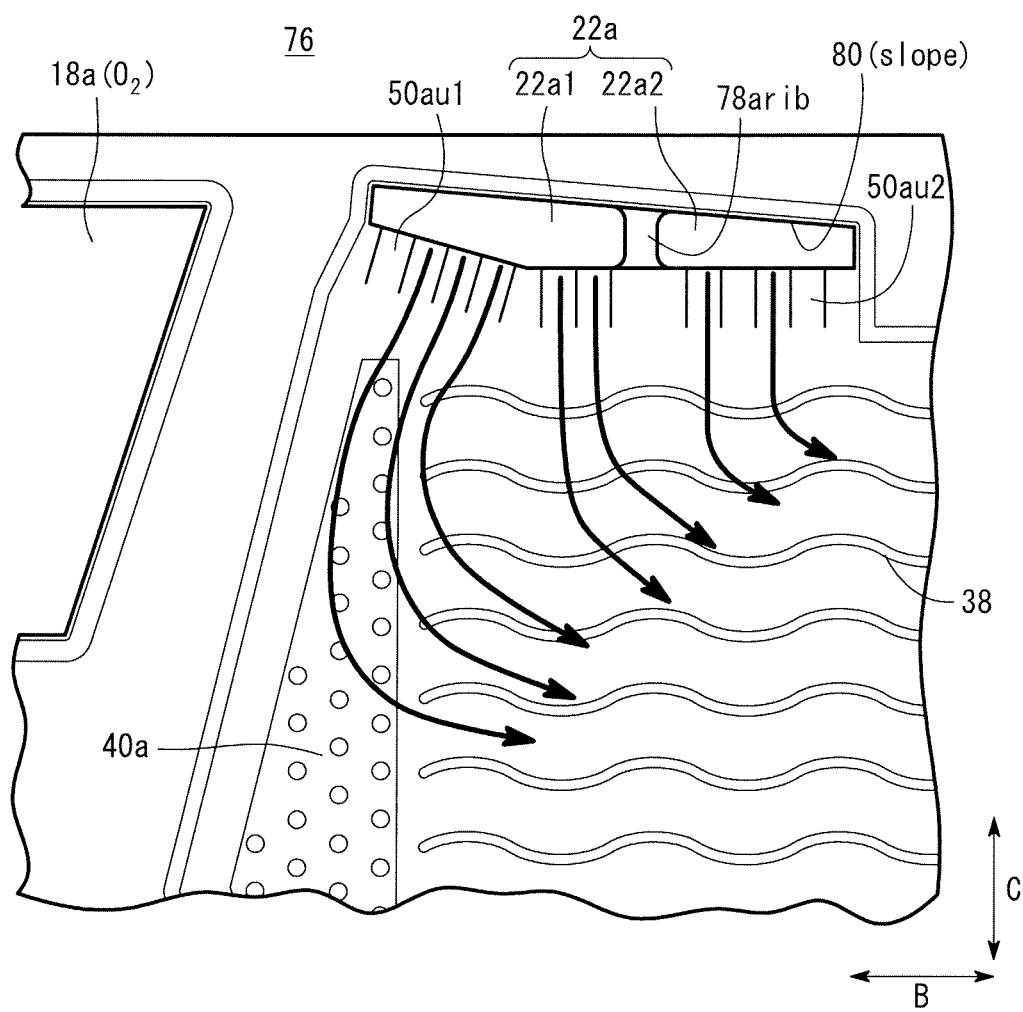
FIG. 11 is a view showing main components of a coolant supply passage of the fuel cell.

In contrast, in the example a of the present application, the pressure loss in the first area 22*a*1 is lower than the pressure loss in the second area 22*a*2. Thus, as shown in FIG. 11, the flow rate of the coolant supplied from the first area 22*a*1 is larger than the flow rate of the coolant supplied from the second area 22*a*2.

Therefore, the flow rate of the coolant bypassed from the inlet connection channel 50*au*1 to the inlet buffer 40*a* is increased, and the coolant is reliably supplied to the central part of the power generation area. Accordingly, with the simple structure, it is possible to supply the coolant over the entire power generation area, and it becomes possible to suppress local degradation or stagnation of water due to the non-uniform temperature.

Further, the slope 80 is provided in the second area 22*a*2 for decreasing the cross sectional area of the opening as the opening is remoter from the inlet buffer 40*a*. In the structure, in the second area 22*a*2, a large quantity of coolant can be supplied to the side closer to the inlet buffer 40*a*, in comparison with the side remoter from the inlet buffer 40*a*, and the coolant can be supplied to the coolant flow field 38 uniformly over the entire width direction.

Each of the coolant discharge passage 22*b* is divided into the first area 22*b*1 and the second area 22*b*2 by the rib 78*brib*. Thus, the same advantages as in the case of the coolant supply passage 22*a* are obtained. Further, as necessary, the rib 78*brib* may not be employed in the coolant discharge passages 22*b*. Moreover, the rib 78*brib* may be employed only in the coolant discharge passages 22*b*.

Figure 12:
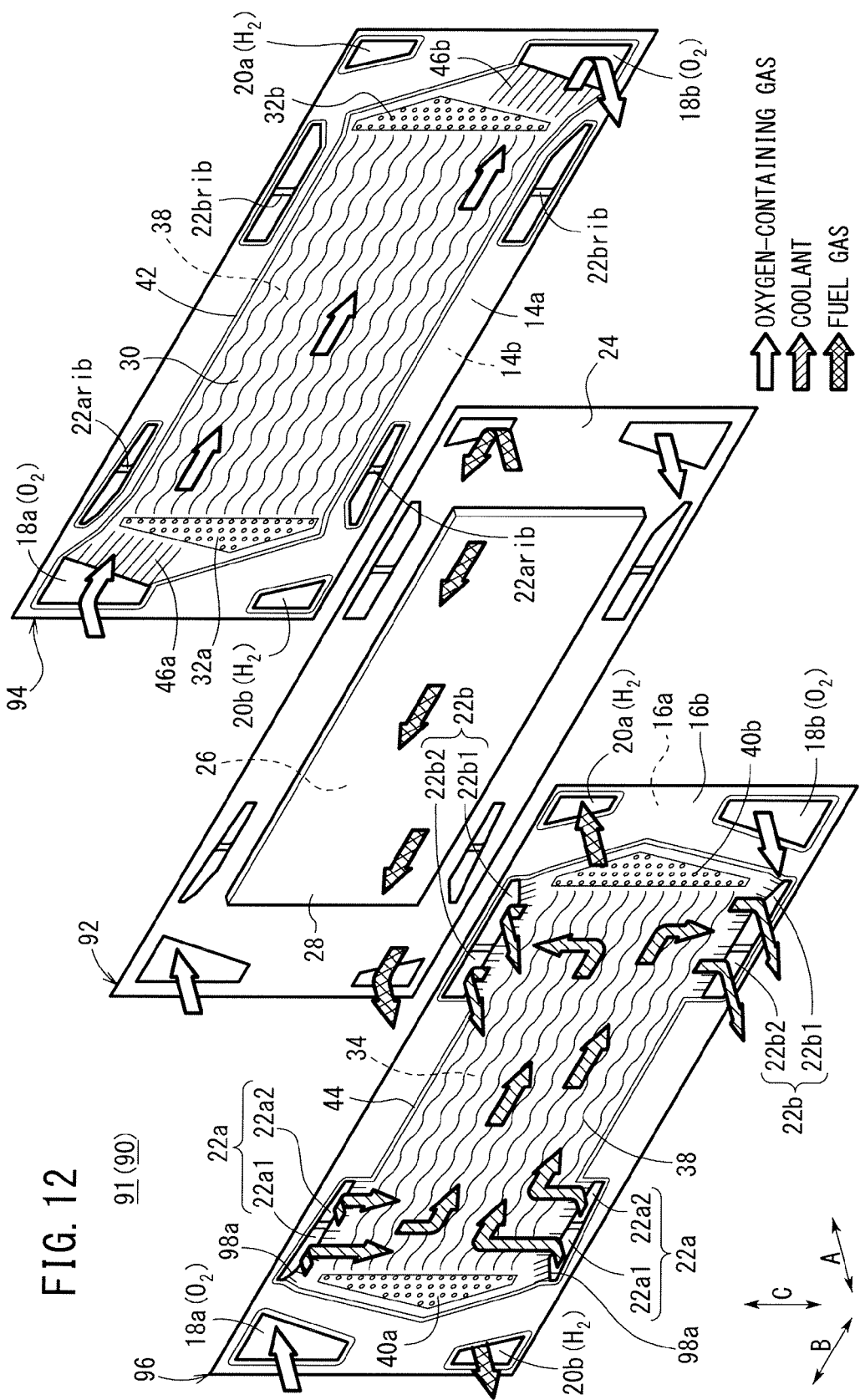
FIG. 12 is an exploded perspective view showing main components of a fuel cell of a fuel cell stack according to a fourth embodiment of the present invention.

As shown in FIG. 12, a fuel cell stack 90 according to a fourth embodiment of the present invention is formed by stacking a plurality of fuel cells 91 together upright in a direction indicated by an arrow A (such that electrode surfaces are oriented in parallel with the vertical direction). Each of the fuel cells 91 includes a membrane electrode assembly 92 and a cathode side separator 94 and an anode side separator 96 sandwiching the membrane electrode assembly 92.

A slope 98*a* is provided in the first area 22*a*1 for decreasing the cross sectional area of the opening in a direction closer to the inlet buffer 40*a*. The slope 98*a* is inclined in a direction away from the inlet buffer 40*a* toward the horizontal direction indicated by the arrow B.

Figure 13:
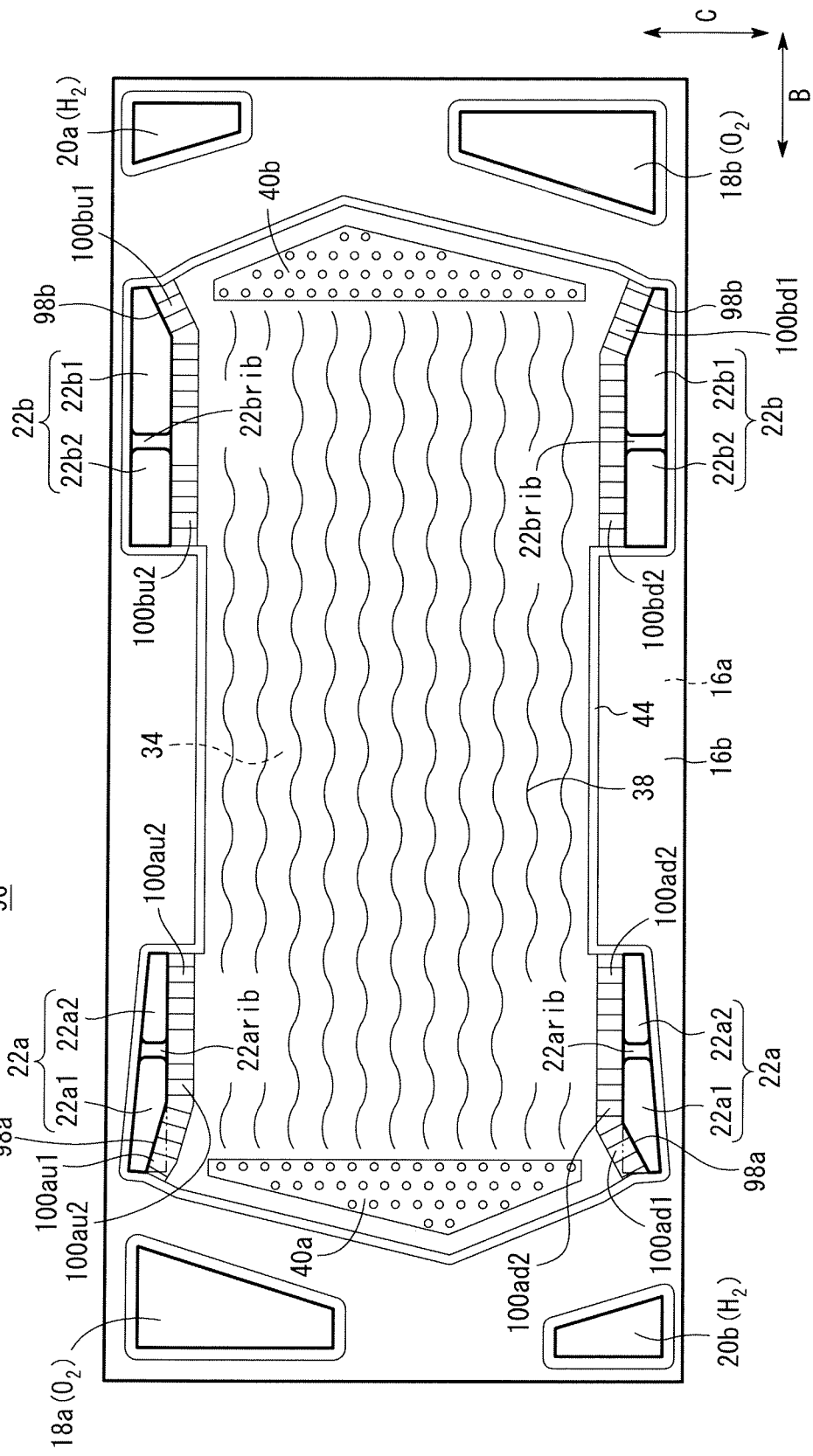
FIG. 13 is a front view showing an anode side separator of the fuel cell.

As shown in FIG. 13, inlet connection channels 100*au*1, 100*au*2 are formed adjacent to the coolant supply passage 22*a* on the upper side, and inlet connection channels 100*ad*1, 100*ad*2 are formed adjacent to the coolant supply passage 22*a* on the lower side.

The inlet connection channel 100*au*1 is provided at the slope 98*a* on the upper side, and connects the coolant supply passage 22*a* on the upper side and the inlet buffer 40*a*. The inlet connection channel 100*ad*1 is provided at the slope 98*a* on the lower side, and connects the coolant supply passage 22*a* on the lower side and the inlet buffer 40*a*.

The inlet connection channel 100*au*1 extends in a direction perpendicular to the slope 98*a*, i.e., the inlet connection channel 100*au*1 is inclined toward the inlet buffer 40*a*. The flow grooves in the inlet connection channel 100*au*1 have the same length. The inlet connection channel 100*ad*1 extends in a direction perpendicular to the slope 98*a*, i.e., the inlet connection channel 100*ad*1 is inclined toward the inlet buffer 40*a*. The flow grooves in the inlet connection channel 100*ad*1 have the same length. The number of flow grooves in the inlet connection channel 100*au*1 is different from the number of flow grooves in the inlet connection channel 100*ad*1. Alternatively, the number of flow grooves in the inlet connection channel 100*au*1 may be the same as the number of flow grooves in the inlet connection channel 100*ad*1.

The inlet connection channel 100*au*2 connects the coolant supply passage 22*a* on the upper side and the coolant flow field 38. The inlet connection channel 100*ad*2 connects the coolant supply passage 22*a* on the lower side and the coolant flow field 38.

A slope 98*b* is provided in the first area 22*b*1 for decreasing the cross sectional area of the opening in a direction closer to the outlet buffer 40*b*. The slope 98*b* is inclined in a direction away from the outlet buffer 40*b* toward the horizontal direction indicated by the arrow B. The slopes 98b on the outlet side may be provided as necessary. It is sufficient to provide at least the slope 98a on the inlet side.

Outlet connection channels 100bu1, 100bu2 are formed adjacent to the coolant discharge passage 22b on the upper side, and outlet connection channels 100bd1, 100bd2 are formed adjacent to the coolant discharge passage 22b on the lower side.

The outlet connection channel 100bu1 is provided at the slope 98b on the upper side, and connects the coolant discharge passage 22b on the upper side and the outlet buffer 40b. The outlet connection channel 100bd1 is provided at the slope 98b on the lower side, and connects the coolant discharge passage 22b on the lower side and the outlet buffer 40b.

The outlet connection channels 100bu1, 100bd1 extend in directions perpendicular to the slopes 98b, i.e., the outlet connection channels 100bu1, 100bd1 are inclined toward the outlet buffer 40b. The flow grooves in outlet connection channels 100bu1, 100bd1 have the same length. The number of flow grooves in the outlet connection channel 100bu1 is different from the number of flow grooves in the outlet connection channel 100bd1. Alternatively, the number of flow grooves in the outlet connection channel 100bu1 may be the same as the number of flow grooves in the outlet connection channel 100bd1.

The outlet connection channel 100bu2 connects the coolant discharge passage 22b on the upper side and the coolant flow field 38. The outlet connection channel 100bd2 connects the coolant discharge passage 22b on the lower side and the coolant flow field 38.

In the fourth embodiment, as shown in FIG. 13, at least the coolant supply passages 22a include the slopes 98a which decrease the cross sectional areas of the openings in directions closer to the inlet buffer 40a. Further, a plurality of flow grooves are provided in the inlet connection channel 100au1 and a plurality of flow grooves are provided in the inlet connection channel 100ad1, and these flow grooves extend in directions perpendicular to the slopes 98a, i.e., the inlet connection channels 100au1, 100ad1 are inclined toward the inlet buffer 40a. In the structure, the coolant flows from each of the inlet connection channels 100au1, 100ad1 toward the central part of the inlet buffer 40a. Accordingly, the coolant can be supplied reliably not only toward both ends adjacent to the pair of coolant supply passages 22a but also toward the central position in the width direction.

Figure 14:
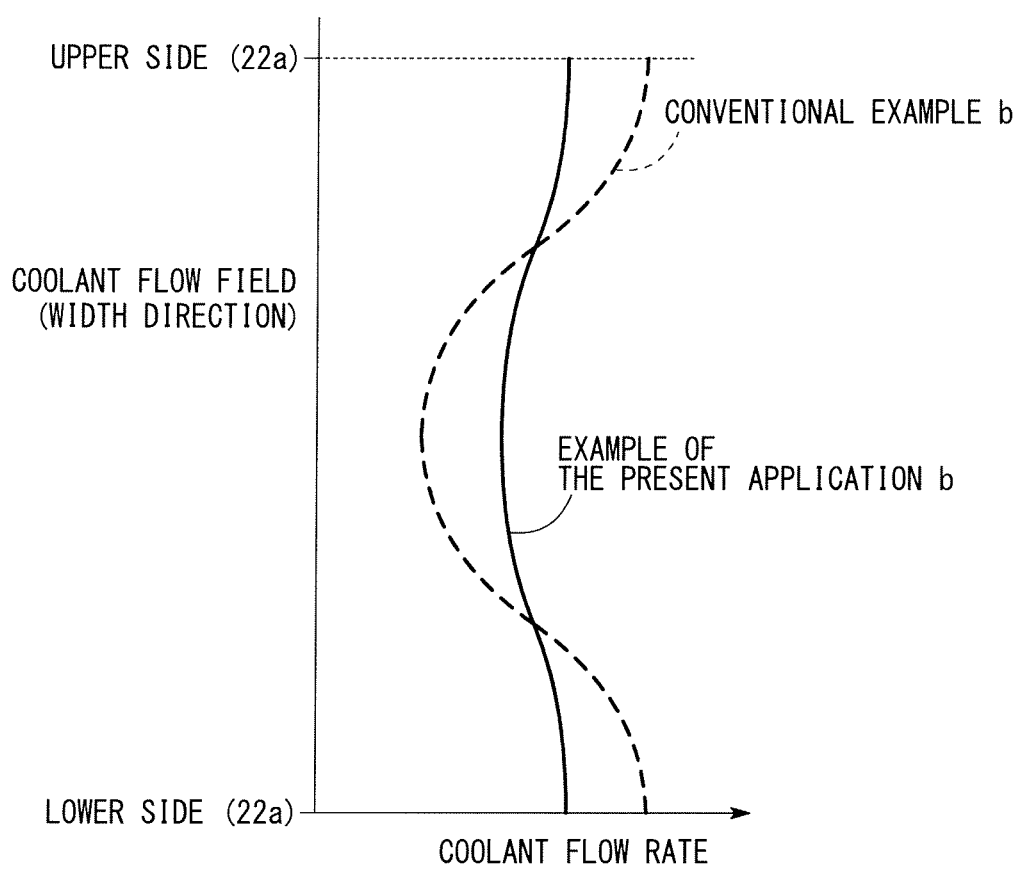
FIG. 14 is a graph showing comparison of the flow rate of a coolant supplied to a coolant flow field in an example b of the present application and a conventional example b.

In this regard, for comparison of the distribution state of the coolant supplied to the coolant flow field 38, structure without the slope in the coolant supply passage 22a (conventional example b) (see two dot chain line in FIG. 13) and structure having the slope 98a (example b of the present application) were used. As a result, as shown in FIG. 14, in the structure of the conventional example b, a large quantity of coolant was supplied from the coolant supply passage 22a to the coolant flow field 38 directly, and a small quantity of the coolant was bypassed toward the central part of the inlet buffer 40a.

In the structure, a large quantity of coolant is supplied to positions at both ends in the width direction of the coolant flow field 38 (adjacent to the coolant supply passages 22a), and only a small quantity of coolant is supplied to the central part of the power generation area. Therefore, a significant temperature difference occurs in the width direction in the coolant flow field 38. Thus, the durability and the power generation performance are low.

Figure 15:
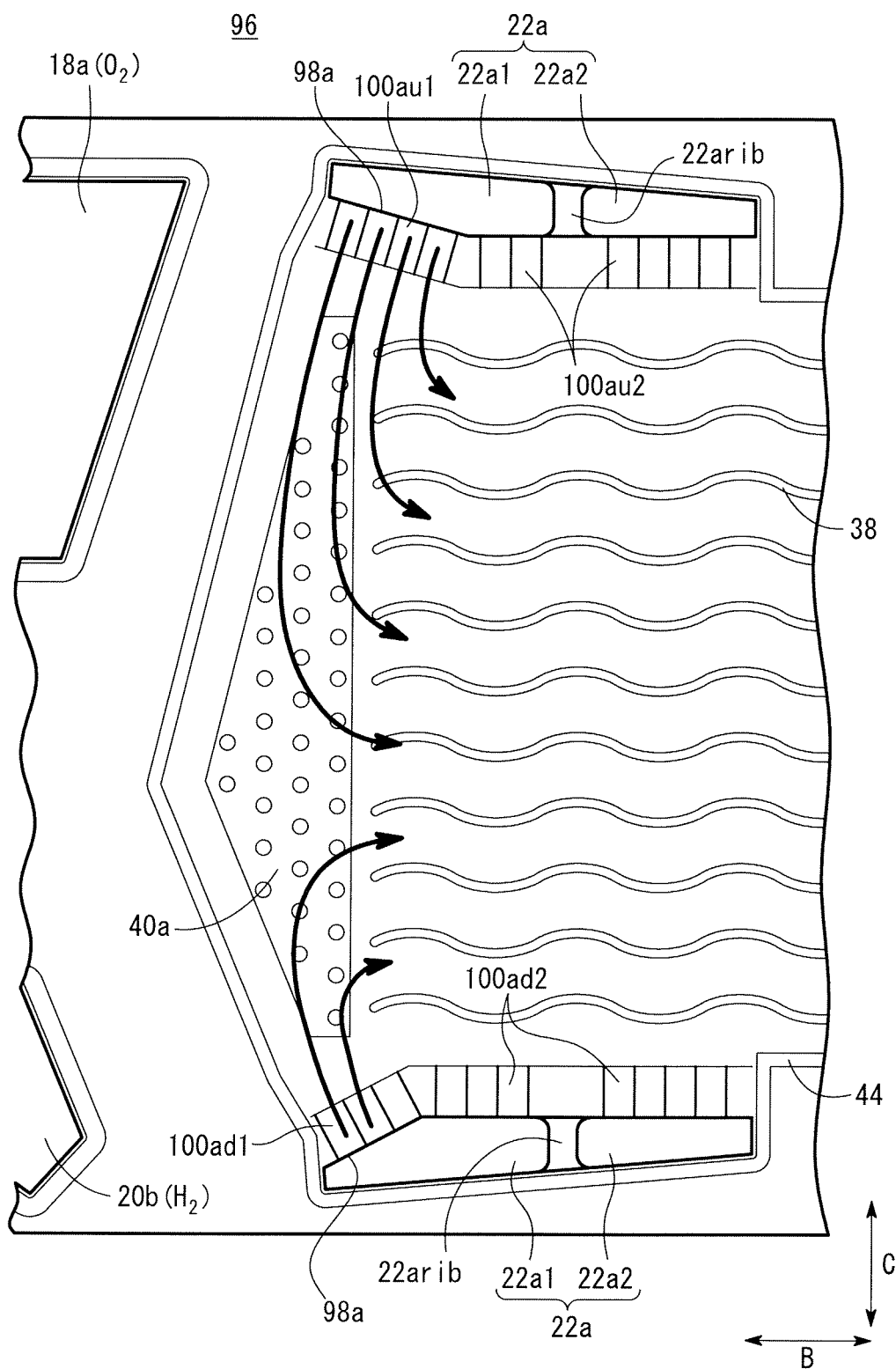
FIG. 15 is a graph showing main components of coolant supply passages of the fuel cell.

In contrast, in the example b of the present application, the inlet connection channel 100au1 and the inlet connection channel 100ad1 connected to the pair of slopes 98a are inclined toward the inlet buffer 40a. Thus, the coolant supplied from the inlet connection channel 100au1 and the inlet connection channel 100ad1 to the inlet buffer 40a is suitably supplied to the central part of the inlet buffer 40a in the width direction (see FIG. 15). Accordingly, the coolant can be supplied to the entire inlet buffer 40a uniformly over the width direction.

Thus, it becomes possible to supply the coolant to the entire inlet buffer 40a suitably, and supply the coolant to the entire coolant flow field 38 uniformly. With the simple structure, the present invention can supply the coolant over the entire power generation area, and suppress local degradation or stagnation of water due to the non-uniform temperature as much as possible.

It should be noted that the structure on the part of the coolant discharge passages 22b is the same as the structure on the part of the coolant supply passages 22a, and thus, the same advantages can be obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack formed by stacking a plurality of fuel cells together, the fuel cells each being formed by stacking a membrane electrode assembly and separators together, the membrane electrode assembly including a pair of electrodes and an electrolyte membrane interposed between the electrodes, a coolant flow field being formed between adjacent separators for allowing a coolant to flow along surfaces of the separators, a pair of coolant supply passages being provided at an inlet of the coolant flow field, with a respective one of said coolant supply passages situated on each of two sides of the coolant flow field in a flow field width direction, a pair of coolant discharge passages being provided at an outlet of the coolant flow field, with a respective one of said coolant discharge passages situated on each of two sides of the coolant flow field in the flow field width direction, wherein an inlet buffer is provided at the inlet of the coolant flow field, between the pair of coolant supply passages, and an outlet buffer is provided at the outlet of the coolant flow field, between the pair of coolant discharge passages;

each of the buffers has an asymmetrical triangular shape having a vertex at a position spaced from a center in the flow field width direction toward one side in the flow field width direction;

the pair of coolant supply passages are connected to the inlet buffer through inlet connection channels, each of the coolant supply passages has a slope for decreasing a cross sectional area of the opening in a direction closer to the inlet buffer such that each of the inlet connection channels, respectively, have flow grooves which are directed toward the inlet buffer; and the pair of coolant discharge passages are connected to the outlet buffer through outlet connection channels; and a number of flow grooves in one of the inlet connection channels for the pair of coolant supply passages is different from a number of flow grooves in another of the inlet connection channels.

2. The fuel cell stack according to claim 1, wherein the number of flow grooves in the connection channel on a side closer to the vertex of the inlet buffer is smaller than the number of flow grooves in the connection channel on a side remoter from the vertex of the inlet buffer.

3. The fuel cell stack according to claim 1, wherein at positions adjacent to the inlet buffer, an oxygen-containing gas passage for allowing an oxygen-containing gas to flow in a stacking direction of the fuel cells and a fuel gas passage for allowing a fuel gas to flow in the stacking direction of the fuel cells are arranged in the flow field width direction; and an opening area of the oxygen-containing gas passage is larger than an opening area of the fuel gas passage, and the vertex of the inlet buffer is spaced from center in the flow field width direction toward the fuel gas passage.

4. A fuel cell stack formed by stacking a plurality of fuel cells together, the fuel cells each being formed by stacking a membrane electrode assembly and separators together, the membrane electrode assembly including a pair of electrodes and an electrolyte membrane interposed between the electrodes, a coolant flow field being formed between adjacent separators for allowing a coolant to flow along surfaces of the separators, a pair of coolant supply passages being provided at an inlet of the coolant flow field, on both sides of the coolant flow field in a flow field width direction, a pair of coolant discharge passages being provided at an outlet of the coolant flow field, on both sides of the coolant flow field in the flow field width direction, wherein at least each of the coolant supply passages or the coolant discharge passages has a rectangular opening elongated in a flow direction of the coolant flow field, and a rib is provided at an intermediate position of the rectangular opening in the longitudinal direction for dividing the rectangular opening into a first area and a second area, and wherein each of the coolant supply passages has a slope in the second area for decreasing a cross sectional area of an opening as the opening is remoter from the buffer.

5. The fuel cell stack according to claim 4, wherein a buffer is provided at the inlet of the coolant flow field, between the pair of coolant supply passages, and a buffer is provided at the outlet of the coolant flow field, between the pair of coolant discharge passages; and in comparison with the second area, the first area is closer to the buffer, and an opening area of the first area is larger than an opening area of the second area.

6. A fuel cell stack formed by stacking a plurality of fuel cells together, the fuel cells each being formed by stacking a membrane electrode assembly and separators together, the membrane electrode assembly including a pair of electrodes and an electrolyte membrane interposed between the electrodes, a coolant flow field being formed between adjacent separators for allowing a coolant to flow along surfaces of the separators, a pair of coolant supply passages being provided at an inlet of the coolant flow field, on both sides of the coolant flow field in a flow field width direction, a pair of coolant discharge passages being provided at an outlet of the coolant flow field, on both sides of the coolant flow field in the flow field width direction, wherein a buffer is provided at the inlet of the coolant flow field, between the pair of coolant supply passages, and a buffer is provided at the outlet of the coolant flow field, between the pair of coolant discharge passages; and at least each of the coolant supply passages has a rectangular opening elongated in a flow direction of the coolant flow field, and has a slope for decreasing a cross sectional area of the opening in a direction closer to the buffer.

7. The fuel cell stack according to claim 6, wherein at least the coolant supply passages and the buffer are connected through connection channels each including a plurality of flow grooves, and the plurality of flow grooves in the connection channels have the same length.

8. The fuel cell stack according to claim 7, wherein the plurality of flow grooves in the connection channels are inclined toward the buffer in the flow direction of the coolant flow field, and arranged in parallel to each other.

9. The fuel cell stack according to claim 1, wherein four coolant supply passages are provided at the inlet of the coolant flow field, and wherein four coolant discharge passages are provided at the outlet of the coolant flow field.

10. The fuel cell stack according to claim 1, wherein each of the coolant supply passages and each of the coolant discharge passages has a rectangular opening elongated in a flow direction of the coolant flow field, and a rib is provided at an intermediate position of the rectangular opening in the longitudinal direction for dividing the rectangular opening into a first area and a second area.

11. The fuel cell stack according to claim 10 wherein, in comparison with the second area, the first area is closer to the buffer, and an opening area of the first area is larger than an opening area of the second area.

12. The fuel cell stack according to claim 10, wherein the coolant supply passage has a slope in the second area for decreasing a cross sectional area of an opening as the opening becomes more remote from the inlet buffer.

13. The fuel cell stack according to claim 1, wherein each of the coolant supply passages has a rectangular opening elongated in a flow direction of the coolant flow field, and part of each opening has a slope for decreasing a cross sectional area of the opening as the opening becomes more remote from the inlet buffer.

* * * * *